(12) United States Patent
Kadowaki

(10) Patent No.: US 8,081,275 B2
(45) Date of Patent: Dec. 20, 2011

(54) LIQUID CRYSTAL DISPLAY DEVICE

(75) Inventor: Jun Kadowaki, Chiba (JP)

(73) Assignee: Seiko Instruments Inc. (JP)

( * ) Notice: Subject to any disclaimer, the term of this patent is extended or adjusted under 35 U.S.C. 154(b) by 285 days.

(21) Appl. No.: 12/378,179

(22) Filed: Feb. 11, 2009

(65) Prior Publication Data

US 2009/0213308 A1 Aug. 27, 2009

(30) Foreign Application Priority Data

Feb. 14, 2008 (JP) .................................. 2008-033074

(51) Int. Cl.
*G02F 1/1335* (2006.01)
(52) U.S. Cl. ........................................ 349/106; 349/110
(58) Field of Classification Search .................. None
See application file for complete search history.

(56) References Cited

U.S. PATENT DOCUMENTS

| | | | | |
|---|---|---|---|---|
| 6,097,467 | A | * | 8/2000 | Fujimaki et al. ............. 349/155 |
| 7,804,552 | B2 | * | 9/2010 | Yamazaki et al. ............. 349/44 |
| 2001/0026347 | A1 | * | 10/2001 | Sawasaki et al. ............. 349/156 |
| 2009/0161047 | A1 | * | 6/2009 | Cho et al. ...................... 349/106 |

* cited by examiner

*Primary Examiner* — Thanh-Nhan Nguyen
(74) *Attorney, Agent, or Firm* — Adams & Wilks

(57) ABSTRACT

A liquid crystal color display device has a light shielding film formed on a color filter substrate at positions overlying TFT elements formed on a TFT substrate. A color filter provided on the color filter substrate has blue-colored and green-colored layers laminated on the light shielding film at regions corresponding to green display pixels, blue-colored and red-colored layers laminated on the light shielding film at regions corresponding to red display pixels, and a blue-colored layer formed on the light shielding film at regions corresponding to blue display pixels. The laminated colored layers reduce reflection of blacklight by the light shielding film onto the TFT elements to prevent leak current of the TFT elements thereby preventing deterioration of the display quality.

17 Claims, 3 Drawing Sheets

LIQUID CRYSTAL DISPLAY DEVICE

BACKGROUND OF THE INVENTION

1. Field of the Invention

The present invention relates to a liquid crystal display device, and more particularly, to a liquid crystal display device in which light shielding property of a thin film transistor portion is enhanced.

2. Description of the Related Art

A liquid crystal display device has features of being slim and lightweight, consuming low power, and the like. An active matrix liquid crystal display device which uses a transistor characteristically has a large contrast and high response speed, and thus is widely used in a television, a personal computer, a portable electronic device, or the like. Moreover, in recent years, along with improvements made in luminance, definition, and color purity of the liquid crystal display device, high performance has been required for the liquid crystal display device. As the transistor used in the liquid crystal display device, there is employed a thin film transistor (TFT) in which a transistor is formed on a silicon thin film. In the active matrix liquid crystal display device using the TFT, when light output from a light source or ambient light enters a channel region of the TFT, a leak current flows due to the entering light, which changes TFT characteristics to degrade display quality thereof. In order to solve the above-mentioned problem, there is known a method of disposing a lattice-like light shielding film around respective pixel portions so that light does not enter the TFT. An example of the liquid crystal display device as described above is illustrated in FIG. 1 and FIG. 2.

FIG. 1 is a cross-sectional view in which an enlarged cross-section of a TFT element is illustrated. FIG. 2 is an enlarged plan view illustrating a part of a group of adjacent pixels in a liquid crystal display device in which a data line, a scanning line, a pixel electrode, a light shielding film, a color filter, and the like are formed. A color filter substrate 1 includes a light shielding film 5 for shielding light at a boundary between pixels, a color filter 6, and a common electrode 8 on a side of a glass substrate 3 in proximity to a liquid crystal layer 15. The color filter 6 generally is formed of a red-colored layer (R), a green-colored layer (G), and a blue-colored layer (B) which are three primary colors of light. On a TFT array substrate 2, on a side of a glass substrate 4 in proximity to a liquid crystal layer 15, a plurality of scanning lines 9 and a plurality of signal lines 12 are provided so as to intersect each other, thin film transistors (TFTs) 16 are each disposed at a portion in which the scanning line 9 and the signal line 12 intersect each other, and pixel electrodes 14 each connected to the TFT are disposed. The color filter substrate 1 and the TFT array substrate 2 sandwich a liquid crystal layer 15 therebetween, and a periphery of a display unit is sealed, to thereby form the liquid crystal display device.

The TFT 16 disposed on the TFT array substrate 2 includes the scanning line 9, an insulating film 10, a semiconductor layer 11, and the signal line 12 and a drain electrode 13 which are connected to the semiconductor layer 11. The drain electrode 13 is connected to the pixel electrode 14, and liquid crystal is driven by means of an electric field formed between the pixel electrode 14 and a common electrode 8.

Conventionally, a backlight A of the liquid crystal display device passes through an aperture of a pixel, and then is reflected on the light shielding film 5 of the color filter substrate 1, thereby entering the TFT 16 disposed on the TFT array substrate 2. Accordingly, there is a problem in that a leak current generated by the light entering the TFT 16 changes TFT characteristics, and a contrast of a display image is lowered, which degrades the display quality. In order to solve this problem, there is known a method in which reflected light caused by the light shielding film 5 is reduced with the use of the color filter 6, an amount of light entering the TFT is reduced, whereby the leak current is prevented to maintain the display quality. Further, it is known to use a colored layer pattern of colors which sufficiently absorb short-wavelength light as colored layers of the color filter disposed on the light shielding film 5, whereby the leak current is effectively suppressed (for example, see JP 2001-91971 A).

In recent years, along with an increase in light amount of backlight for displaying a bright image, countermeasures against the leak current caused by light have been increasingly important.

SUMMARY OF THE INVENTION

In order to solve the above-mentioned problem, it is an object of the present invention to provide a liquid crystal display device which easily reduces light entering a TFT and prevents the leak current of the TFT from occurring, to thereby maintain display quality thereof.

A liquid crystal display device according to the present invention performs color display using a blue display pixel and display pixels for colors other than blue, and includes: a substrate including a TFT formed thereon; a counter substrate including a color filter formed thereon, the color filter including a blue-colored layer and colored layers of colors other than blue; and a liquid crystal layer disposed in a gap formed between the substrate and the counter substrate. Further, the liquid crystal display device includes a light shielding film having light shielding property, which is formed at a position facing the TFT of the counter substrate, and the blue-colored layer and the colored layers of colors other than blue are laminated on the light shielding film corresponding to the display pixels for colors other than blue. With a structure as described above, the light entering the TFT is reduced by the laminated colored layers, with the result that the leak current of the TFT can be prevented from occurring.

In addition, a columnar spacer is disposed above the light shielding film corresponding to the blue display pixel. By disposing the columnar spacer as described above, cell gap variations of liquid crystal, which result from film thickness variations of the color filter, are suppressed, with the result that the light entering the TFT can be reduced.

Moreover, the blue-colored layer is disposed between the light shielding film and the colored layers of colors other than blue.

Further, the light shielding film is formed at a position for separating the respective display pixels disposed on the counter substrate.

According to the present invention, owing to colors of the laminated color filters, the light entering the TFT is reduced, and the leak current of the TFT is prevented from occurring to stabilize TFT characteristics, whereby display quality of the liquid crystal display device can be maintained. Moreover, the liquid crystal display device can be manufactured by employing a method similar to a conventional method, performance thereof can be improved while a stable yield is obtained, without affecting its price.

The liquid crystal display device according to the present invention includes: the substrate including the TFT formed thereon; the counter substrate including the color filter formed thereon; and the liquid crystal layer disposed in a gap formed between the substrate and the counter substrate, and uses the display pixels to perform the color display. The light shielding film having light shielding property is formed at the position facing the TFT of the counter substrate, and the blue-colored layer and the colored layers of colors other than blue are laminated on the light shielding film corresponding to the display pixels for colors other than blue. With the structure as described above, the light entering the TFT is reduced owing to the laminated colored layers, and the leak current of the TFT can be prevented from occurring.

Further, the columnar spacer is disposed above the light shielding film corresponding to the blue display pixel. With this structure, gap variations of the liquid crystal layer, which result from film thickness variations of the color filter, can be restricted to be small. Accordingly, the light entering the TFT is easily reduced while a stable yield is obtained, and the leak current of the TFT is prevented from occurring, with the result that the display quality of the liquid crystal display device can be maintained.

Moreover, the blue-colored layer is disposed between the light shielding film and the colored layers of colors other than blue. Specifically, the blue-colored layer is first formed on the light shielding film, and thereafter the colored layers of colors other than blue are formed.

DETAILED DESCRIPTION OF THE PREFERRED EMBODIMENTS

Hereinafter, preferred embodiments to carry out the present invention are described in more detail by way of embodiments.

First Embodiment

Figure 1:
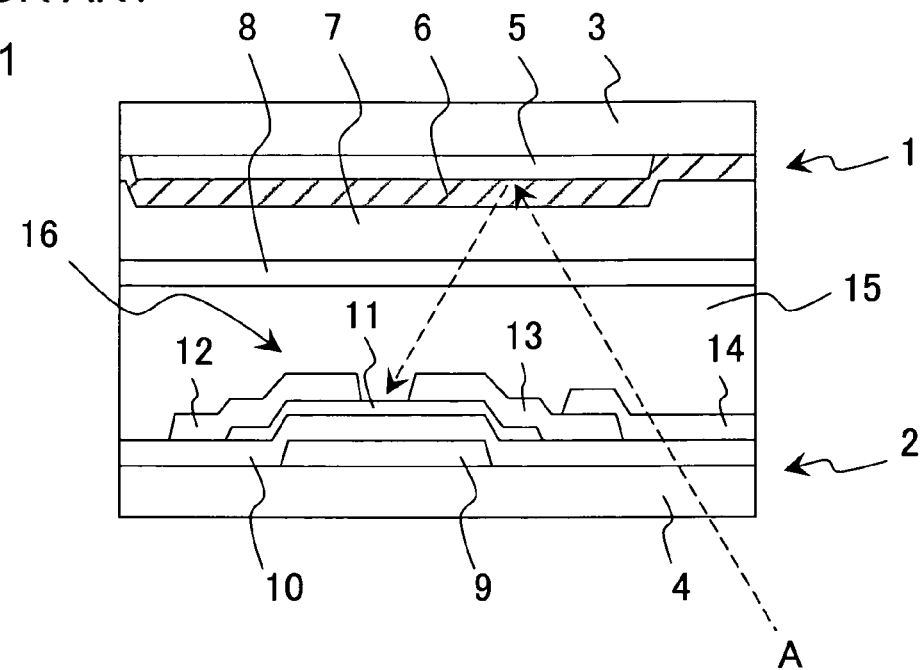
FIG. 1 is an enlarged cross-sectional view illustrating a TFT element.
Figure 2:
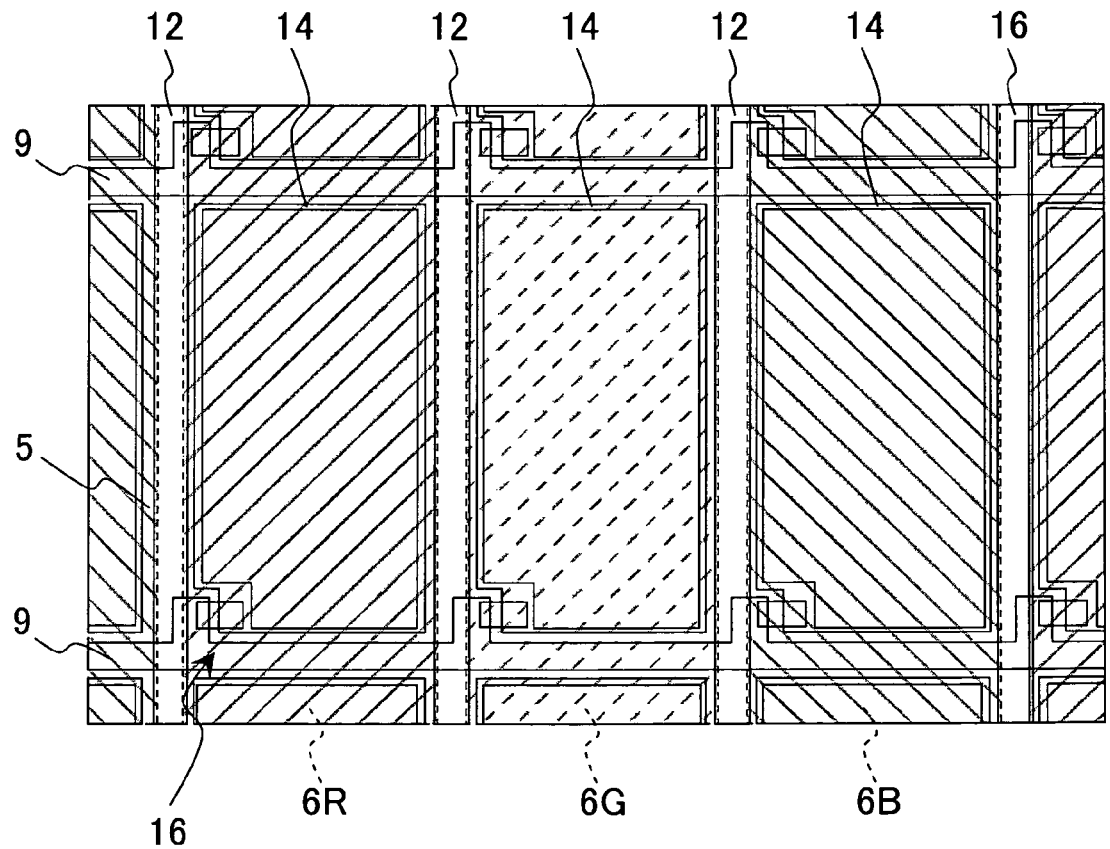
FIG. 2 is an enlarged plan view illustrating a part of a group of adjacent pixels in a liquid crystal display device.
Figure 3:
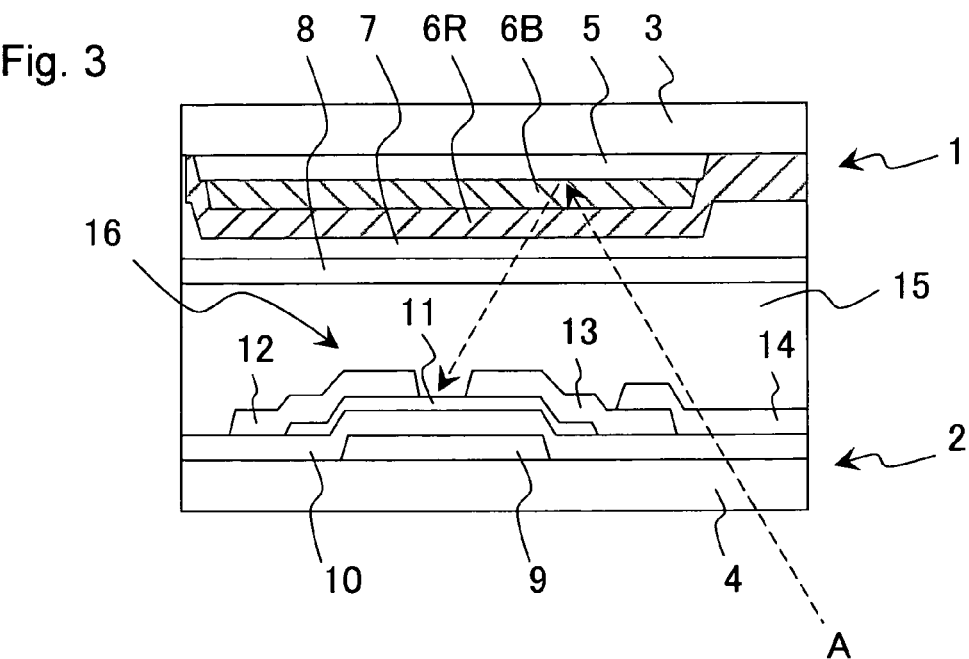
FIG. 3 is an enlarged cross-sectional view illustrating a TFT element of a liquid crystal display device according to a first embodiment of the present invention.
Figure 4:
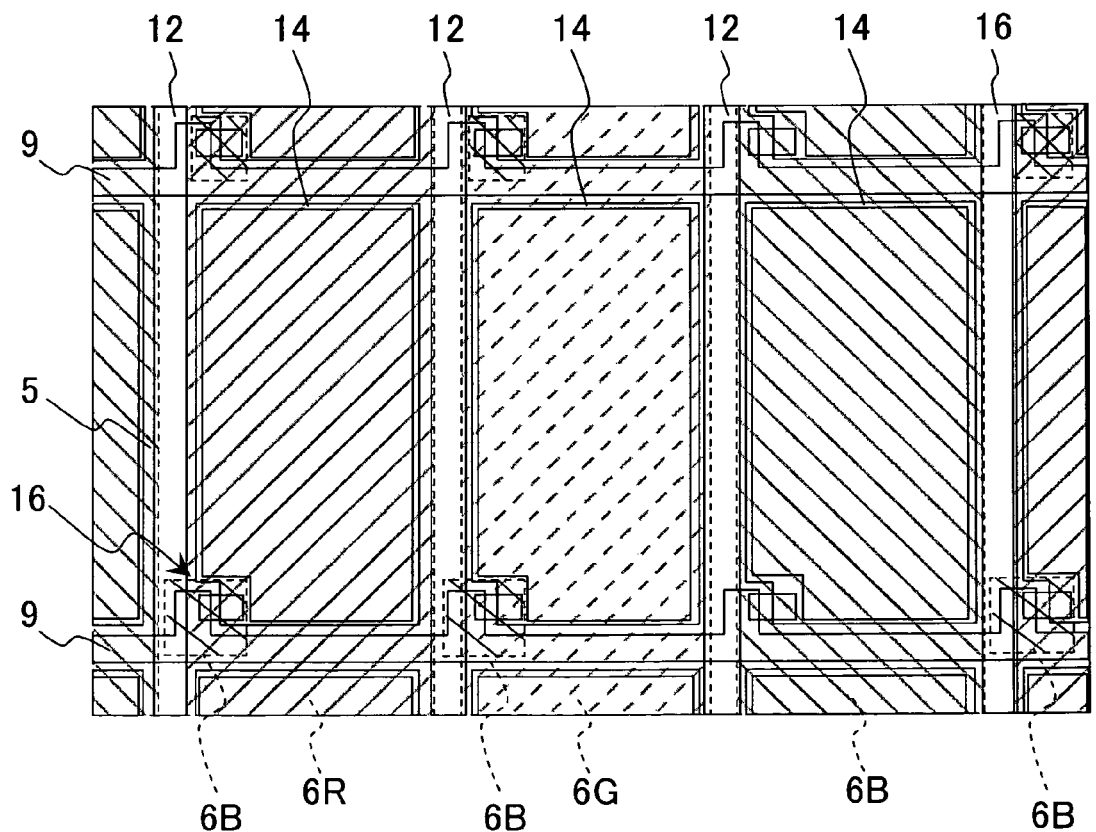
FIG. 4 is an enlarged plan view illustrating a part of a group of adjacent pixels in the liquid crystal display device according to the first embodiment of the present invention.

A first embodiment of the present invention is described with reference to FIG. 3 and FIG. 4. FIG. 3 is an enlarged cross-sectional view illustrating a TFT element of a liquid crystal display device according to this embodiment. FIG. 4 is an enlarged plan view illustrating a part of a group of adjacent pixels. As illustrated in FIG. 3 and FIG. 4, a color filter substrate 1 includes, on a side of a glass substrate 3 in proximity to a liquid crystal layer 15, a light shielding film 5 for shielding light at a boundary between electrodes, a color filter, and a common electrode. The color filter is formed of a red-colored layer, a green-colored layer, and a blue-colored layer which are colored layers of three primary colors of light, that is, red (R), green (G), and blue (B). FIG. 3 illustrates an enlarged region of a display pixel, in which a red-colored layer 6R is formed. The color filter may have an island shape or a stripe shape. On the color filter substrate 1, a transparent resin layer 7 is provided so as to cover the color filter, and the common electrode 8 is formed on the transparent resin layer 7.

A TFT array substrate 2 facing the color filter substrate 1 has a structure in which a TFT is formed on a glass substrate 4 which is opposed to the glass substrate 3. In other words, on a side of the glass substrate 4 in proximity to the liquid crystal layer 15, a plurality of scanning lines 9 and a plurality of signal lines 12 are formed so as to intersect each other, thin film transistors (TFTs) 16 are each formed at a position at which the scanning line 9 and the signal line 12 intersect each other, and pixel electrodes 14 each connected to the TFT are arranged. The liquid crystal layer 15 is interposed in a gap formed between the color filter substrate 1 and the TFT array substrate 2 facing to each other, and a periphery of a display unit is sealed, thereby forming the liquid crystal display device.

As illustrated in FIG. 3, the light shielding film 5 is disposed on the color filter substrate 1 at a position which faces the TFT 16 of the TFT array substrate 2, and a blue-colored layer 6B and the red-colored layer 6R, which is a color of a pixel, are laminated on the light shielding film 5 in a region corresponding to the red pixel. The light shielding film 5 is formed at a position for separating respective display pixels disposed on the color filter substrate 1. In a region of a pixel for green, there is provided a green-colored layer 6G in place of the red-colored layer 6R of FIG. 3. In addition, in a region of a pixel for blue, only the blue-colored layer 6B is provided. In the blue pixel region, effects of reducing light, which are obtained by laminating colored layers of different colors, are smaller compared with a pixel for other colors, but light is absorbed by the blue-colored layer 6B to reduce an amount of light entering the TFT. In the case where the leak current is generated by the light entering the TFT corresponding to the blue-colored layer 6B disposed on the light shielding film 5, transmittance of the pixel for blue changes. However, blue has luminance which is relatively lower compared with red and green, and hence a decrease in contrast is less compared with the other colors. For this reason, display quality can be prevented from deteriorating.

It should be noted that the TFT 16 disposed on the TFT array substrate 2 includes the scanning line 9, an insulating film 10, a semiconductor layer 11, and the signal line 12 and a drain electrode 13 which are connected to the semiconductor layer 11. The drain electrode 13 is connected to the pixel electrode 14, and liquid crystal is driven by means of an electric field formed between the pixel electrode 14 and the common electrode 8.

An arrow of a backlight A shows a state in which a light passes through the red-colored layer 6R and the blue-colored layer 6B to reach the light shielding film 5, is reflected on the light shielding film 5, and then again passes through the blue-colored layer 6B and the red-colored layer 6R to enter the TFT. The laminated blue-colored layer 6B and red-colored layer 6R reduce an amount of the light entering the TFT. In addition, a wavelength region of the light absorbed by the colored layers is enlarged through the lamination of colored layers of different colors, whereby most of the light of the wavelength region, which is a cause for generating the leak current of the TFT, can be absorbed. Accordingly, the light entering the TFT is suppressed to prevent the leak current of the TFT, with the result that the display quality can be maintained.

Second Embodiment

Figure 5:
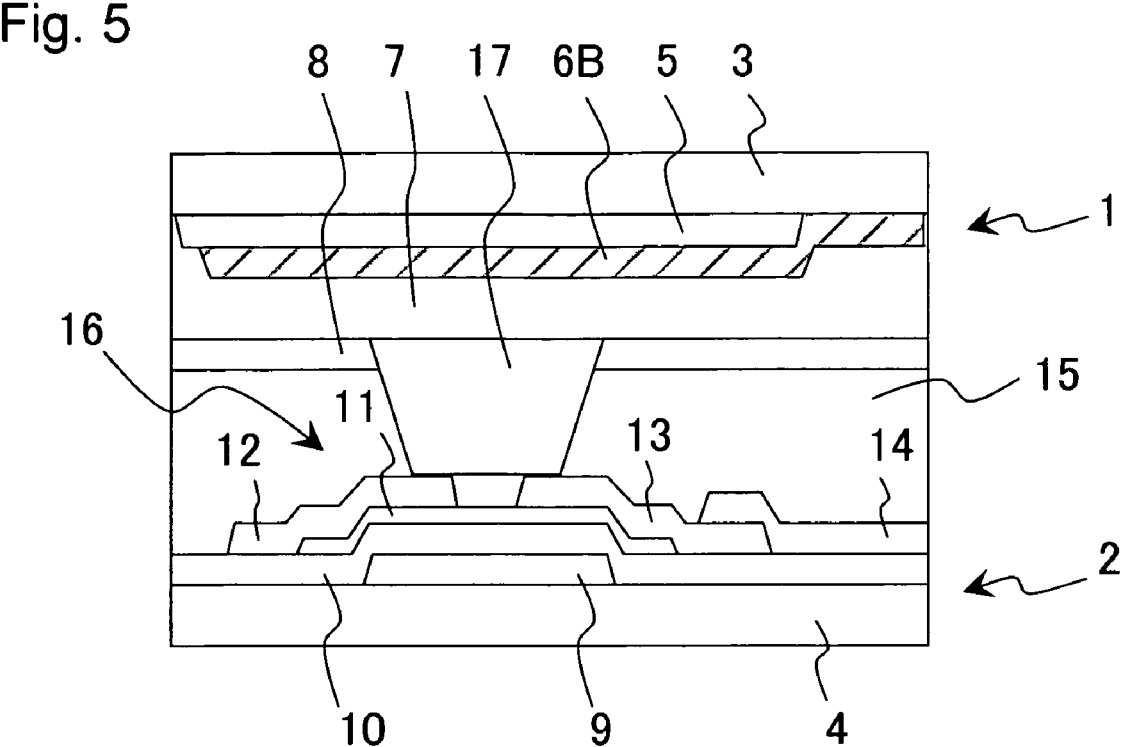
FIG. 5 is an enlarged cross-sectional view illustrating a TFT element of a liquid crystal display device according to a second embodiment of the present invention.

FIG. 5 illustrates a cross-section of a liquid crystal display device according to this embodiment. It should be noted that, in this embodiment, components corresponding to those of the first embodiment are denoted by the same reference symbols, and their descriptions are omitted. FIG. 5 is a schematic view illustrating a cross-sectional structure of a region of the pixel for blue. The cross-sectional structures of the pixels for green and red are the same as those of the first embodiment, and their descriptions are omitted. As illustrated in FIG. 5, only the blue-colored layer 6B is disposed on the light shielding film 5, and the colored layers of the other colors are not laminated thereon. A columnar spacer 17 is formed on the transparent resin layer 7 which is provided so as to cover the light shielding film 5 and the blue-colored layer 6B. The columnar spacer 17 is disposed below the light shielding film 5, between the light shielding film and the TFT array substrate 2, at the region corresponding to the blue pixel. Owing to the columnar spacer 17, cell gap variations of the liquid crystal layer 15, which result from film thickness variations of the color filter, can be restricted to be small. For this reason, the light entering the TFT is easily reduced while a stable yield is obtained, and the leak current of the TFT is prevented from occurring, with the result that the display quality can be maintained. Moreover, through dispersion of, for example, particles which absorb light in the columnar spacer, it is possible to provide a function of reducing an amount of light reaching the TFT.

What is claimed is:

1. A liquid crystal display device which performs color display using colored display pixels including a blue display pixel, a green display pixel and a red display pixel, the device comprising:
    TFT elements, formed on a substrate, for switching the colored display pixels;
    a color filter formed on a counter substrate and having a blue-colored layer, a green-colored layer and a red-colored layer;
    a liquid crystal layer disposed in a gap formed between the substrate and the counter substrate; and
    a light shielding film formed on the counter substrate so as to face the TFT elements,
    wherein only the blue-colored layer and the green-colored layer are laminated on the light shielding film corresponding to the green display pixel, only the blue-colored layer and the red-colored layer are laminated on the light shielding film corresponding to the red display pixel, and only the blue-colored layer is formed on the light shielding film corresponding to the blue display pixel.

2. A liquid crystal display device according to claim 1, further comprising a columnar spacer disposed below the light shielding film only at a region thereof corresponding to the blue display pixel.

3. A liquid crystal display device according to claim 2, wherein the blue-colored layer on the light shielding film corresponding to the green display pixel is disposed between the light shielding film and the green-colored layer, and the blue-colored layer on the light shielding film corresponding to the red display pixel is disposed between the light shielding film and the red-colored layer.

4. A liquid crystal display device according to claim 2, wherein the light shielding film is formed at a position for separating each of the blue display pixel and the green display pixel and the red display pixel.

5. A liquid crystal display device according to claim 1, wherein the blue-colored layer on the light shielding film corresponding to the green display pixel is disposed between the light shielding film and the green-colored layer, and the blue-colored layer on the light shielding film corresponding to the red display pixel is disposed between the light shielding film and the red-colored layer.

6. A liquid crystal display device according to claim 1, wherein the light shielding film is formed at a position for separating each of the blue display pixel and the green display pixel and the red display pixel.

7. A liquid crystal color display device having an array of red, green and blue display pixels, the device comprising:
    first and second substrates spaced apart and opposed to one another;
    a liquid crystal layer sealed in the space between the first and second substrates;
    TFT elements provided on the first substrate at locations corresponding to respective display pixels;
    a light shielding film provided on the second substrate so as to overlie the TFT elements; and
    a color filter provided on the second substrate and having red-colored, green-colored and blue-colored layers, wherein only the blue-colored layer and the green-colored layer are laminated on the light shielding film at regions thereof corresponding to the green display pixels, only the blue-colored layer and the red-colored layer are laminated on the light shielding film at regions thereof corresponding to the red display pixels, and only the blue-colored layer is formed on the light shielding film at regions thereof corresponding to the blue display pixels.

8. A liquid crystal color display device according to claim 7, wherein the display pixels are separated from one another by the light shielding film.

9. A liquid crystal color display device according to claim 8, wherein the light shielding film overlies the space between adjacent display pixels.

10. A liquid crystal color display device according to claim 7, wherein the blue-colored layer on the light shielding film at regions corresponding to the green display pixels is disposed between the light shielding film and the green-colored layer, and the blue-colored layer on the light shielding film at regions corresponding to the red display pixels is disposed between the light shielding film and the red-colored layer.

11. A liquid crystal color display device according to claim 7, further including spacers disposed between the light shielding film and the first substrate at regions corresponding to the blue display pixels but not at regions corresponding to the red and green display pixels.

12. A liquid crystal color display device according to claim 11, wherein the spacers have a columnar shape.

13. A liquid crystal color display device according to claim 11, wherein the display pixels are separated from one another by the light shielding film.

14. A liquid crystal color display device according to claim 13, wherein the light shielding film overlies the space between adjacent display pixels.

15. A liquid crystal color display device according to claim 11, wherein the blue-colored layer on the light shielding film at regions corresponding to the green display pixels is disposed between the light shielding film and the green-colored layer, and the blue-colored layer on the light shielding film at regions corresponding to the red display pixels is disposed between the light shielding film and the red-colored layer.

16. A liquid crystal color display device according to claim 11, wherein the spacers have dispersed therein light absorbing particles.

17. A liquid crystal color display device according to claim 11, wherein the spacers overlie respective TFT elements corresponding to the blue display pixels.

* * * * *